(No Model.)

C. G. P. DE LAVAL.
COW MILKER.

No. 574,357.  Patented Dec. 29, 1896.

WITNESSES:
George W. Jackel
O. S. Cast

INVENTOR
Carl Gustaf Patrik de Laval
by Jacque & Jaeger
ATTORNEYS.

UNITED STATES PATENT OFFICE.

CARL GUSTAF PATRIK DE LAVAL, OF STOCKHOLM, SWEDEN.

COW-MILKER.

SPECIFICATION forming part of Letters Patent No. 574,357, dated December 29, 1896.

Application filed September 9, 1895. Serial No. 561,906. (No model.)

*To all whom it may concern:*

Be it known that I, CARL GUSTAF PATRIK DE LAVAL, a citizen of Sweden, residing at Stockholm, Sweden, have invented certain new and useful Improvements in Milking-Organs for Mechanical Milking Apparatus, of which the following is a specification.

The present invention refers to an improvement in milking-organs for mechanical milking apparatus, by the employment of which the milking is better and more completely executed than hitherto.

The milking-organ in question is characterized by the combination of two elementary organs, namely, one that grips the teat at the base, acting upon the upper part of the teat by pulling the same, and one acting upon the lower part of the teat by straining or squeezing the same. By combining these two elementary organs a new effect is produced, as will be explained below.

Figure 1:
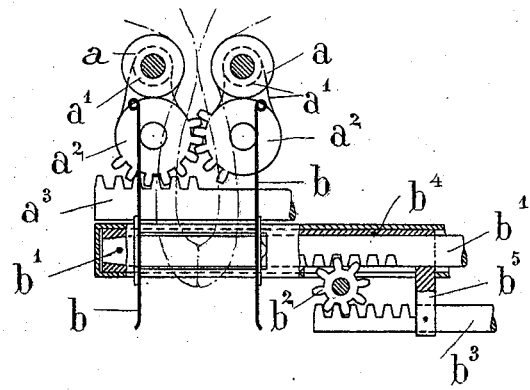
Figure 2:
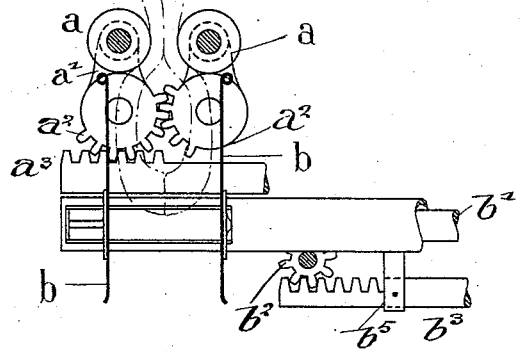
Figure 3:
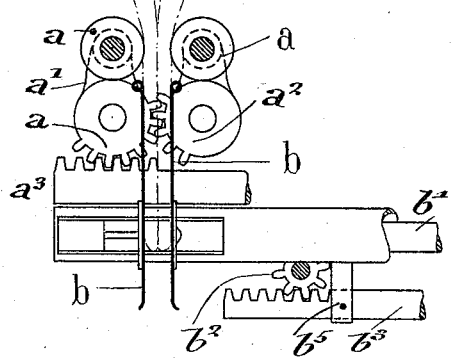

In the accompanying drawings, Figure 1 shows the new milking-organ in vertical section, partly in elevation, with the parts occupying their position at the beginning of the milking operation. Fig. 2 shows the milking-organ in vertical section with the pulling-organ occupying its position at the end of its pulling operation, and Fig. 3 shows the milking-organ in vertical section with the parts occupying their position at the end of a milking operation.

The milking-organ consists of the rolls $a\ a$ and the plates $b\ b$. The rolls $a\ a$ are fixed on the arms $a'\ a'$, formed with cogged segments $a^2\ a^2$, which engage with each other. One of these cogged segments $a^2$, moreover, engages with the toothed bar $a^3$, which has a reciprocating motion simultaneously with an oscillating motion. Thus the rolls receive a motion to and from another, and move also up and down. They grip the teat at the base, shutting off the communication between the channel in the teat and the udder, move then downward, separate from one another, and move upward to the base of the teat. The plates $b\ b$ are situated beneath the rolls $a\ a$ and have a motion to and from each other. For this purpose one plate is fixed to a bar $b'$, which is toothed on the under side and engages by a toothed wheel $b^2$ with a reciprocating bar $b^3$. The other plate $b$ is fixed on a sleeve $b^4$, surrounding the bar $b'$ and connected by an arm $b^5$ with said reciprocating bar $b^3$. The above-described mechanism for moving the rolls and the plates may be varied in different ways without departing from the nature of the invention. They form, therefore, no essential part of the present invention, but are only mentioned as an example to make the invention intelligible. No further description or more complete drawing is therefore necessary.

The combined milking-organ works as follows: On the movement of the rolls $a\ a$ to each other the communication between the udder and the teat is shut off, as above stated, and indicated in Fig. 1. During the following downward pulling movement of the rolls the milk inclosed in the channel of the teat between the rolls and the muscle at the point of the teat makes the teat swell or bulge, as shown in Fig. 2. Said muscle opens only at a certain internal pressure being established, and the ratio of the pulling movement of the rolls is proportioned in such a manner that the rolls move until this pressure is established on the muscle. After having reached their lowest thus-determined position the milk is squeezed up in a bladder with expanded walls, and the plates $b\ b$ begin their straining or squeezing motion, whereby the milk is pressed out of the teat with great ease. During the squeezing motion the rolls constantly shut off the communication between the udder and the teat, thus preventing the milk from flowing backward up into the udder during said motion of the plates.

Having now particularly described my invention and in what manner the same is to be carried out, what I claim as new is—

In milking-organs for mechanical milking apparatus, the combination of a pulling-organ, comprising laterally and downwardly movable members such as rolls, with a squeezing or straining organ, comprising members such as plates, situated beneath the pulling-organ and means for successively operating the pulling and the squeezing organs, substantially as set forth.

In testimony that I claim the foregoing as my invention I have signed my name in presence of two subscribing witnesses.

CARL GUSTAF PATRIK DE LAVAL.

Witnesses:
TYÇKO ROBSAHM,
WALDEMAR BOMAN.